LOW DRIFT D-C OPERATIONAL AMPLIFIER

Filed Sept. 27, 1966

Donald W. Peck,
INVENTOR.
Harry M. Saragovitz
BY Edward J. Kelly
Herbert Berl
Alfred E. Smith United States Patent Office 3,465,259
Patented Sept. 2, 1969

3,465,259

LOW DRIFT D-C OPERATIONAL AMPLIFIER

Donald W. Peck, Newbury Park, Calif., assignor, by mesne assignments, to the United States of America as represented by the Secretary of the Army
Filed Sept. 27, 1966, Ser. No. 583,118
Int. Cl. H03f *1/02*
U.S. Cl. 330—9 1 Claim

ABSTRACT OF THE DISCLOSURE

Amplification of a D-C input signal is obtained by controlling the amplitude of an A-C signal, amplifying the A-C, then rectifying the amplified A-C signal. A feedback path is provided to feed back a portion of the rectified A-C and compare it to the D-C input signal to be amplified. The difference between the D-C input signal and the feedback rectified A-C signal is used to vary the amplitude of the A-C signal fed to the A-C amplifier. The arrangement allows a D-C signal to be effectively amplified, with small amplitude drift in the amplifier.

The amplification of D-C signals without significant drifting of the amplifier is difficult to achieve. Heretofore, rather complicated and/or expensive circuits have been needed to reduce amplitude drifting by D-C amplifiers. Also, D-C signals have been used to vary the amplitude of A-C signals, which A-C signals are then rectified, and are used as amplified versions of the D-C signals. Also, D-C signals have been amplified by balanced modulator techniques. Both of these last methods, and the apparatus therefore, are known in the telegraph art.

The present invention is simpler than a well regulated D-C amplifier or a balanced modulator, and is more stable than either a balanced modulator or an amplifier using rectified A-C.

The invention includes an A-C source connected to an error-sensing control device. This device controls the amplitude of the A-C to an A-C amplifier. The output of the A-C amplifier is rectified by a voltage doubler. The output of the voltage doubler is an amplified version of a D-C input. The D-C input is connected to the error-sensing control device. Also connected to the control device is a D-C signal obtained from the output of the voltage doubler, through a feedback network. The amplitude difference between the two D-C's caused a variation in the A-C to the A-C amplifier. Thus, it can be seen that the invention stabilizes itself, with the D-C input effectively amplified by a desired amount.

An object of the invention is to provide a novel D-C operational amplifier.

Another object is to provide a relatively simple D-C operational amplifier.

The invention may be best understood by reference to the drawing, in which.

Figure 1:
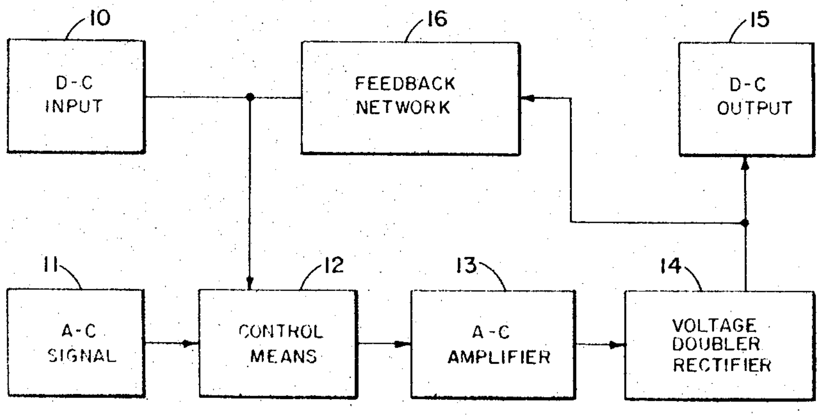
FIGURE 1 shows a schematic block diagram of the invention.

Referring now to FIGURE 1, a D-C signal which it is desired to amplify is applied as an input to box 10. An A-C signal is provided by box 11, and serves as an input to control means 12. Control means 12 provides an A-C output to an A-C amplifier 13. The amplified A-C from 13 is then rectified by a voltage doubler 14. The output of 14 serves as a D-C output for the invention, and provides such an output at 15. A portion of the output of 14 is fed back through a feedback network 16. The D-C output of network 16 is connected to control means 12. The output of 16 is of opposite polarity to the D-C input at 10, so that differences between these D-C's affect control means 12.

Figure 2:
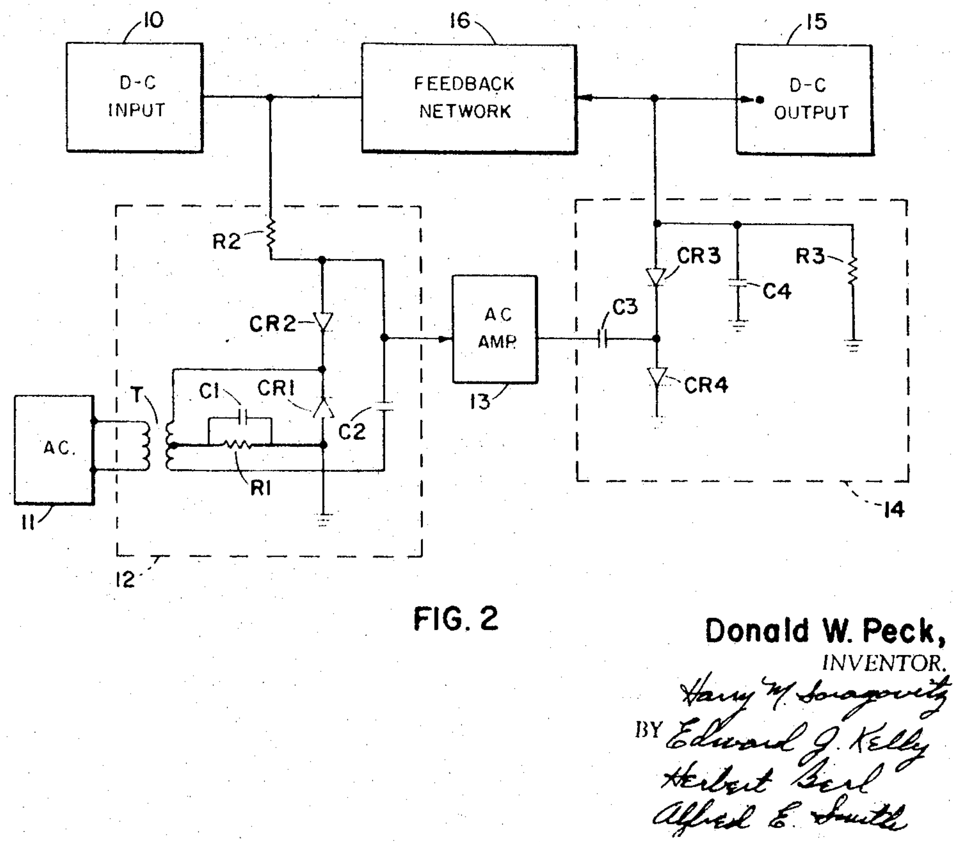
FIGURE 2 shows another schematic diagram of the invention, with some of the blocks of FIGURE 1 being shown in greater detail.

For a better understanding of the operation of control means 12, FIGURE 2 should be referred to. Like numbered blocks in FIGURE 2 correspond to those in FIGURE 1. As can be seen, dotted boxes 12 and 14 are shown in greater detail than in FIGURE 1. The A-C signal from box 11 is fed through transformer T to a circuit including a clamping filter R1-C1, a clamping diode CR1, a blocking diode CR2, and a neutralizing filter C2. The clamp diode (CR1) sets the level of the A-C signals so that the negative peaks are at zero volts. The blocking diode (CR2) blocks the A-C signal from A-C amplifier 13 as long as the difference between the D-C input and the feedback rectified A-C is more negative than zero. Resistor R2 is a current limiting resistor. Box 14 is a standard voltage-doubler rectifier circuit including capacitors C3 and C4, diodes CR3 and CR4, and load resistor R3. The feedback network (16) of FIGURES 1 and 2 could take any of several forms, such as a simple resistive voltage-divider network. A-C source 11 and A-C amplifier 13 could be any of the well known A-C oscillators and amplifiers. While solid-state diodes have been shown on the drawing, obviously, vacuum-tube diodes could be used, if desired.

I claim:

1. A low drift amplifier having an input terminal with a D-C input thereto, and having an output terminal; a control means, an A-C source connected to said control means: A-C amplifying means connected to an output of said control means; rectifier means connected to an output of said amplifying means; feedback means; an output of said rectifier being connected to said output terminal and to said feedback means; an output of said feedback means and said input terminal being each connected to said control means, whereby differences between the D-C input and the D-C from said feedback means cause corresponding variations in the A-C output from said control means; and wherein said control means includes first and second diodes with cathodes connected together, the anode of the first diode being connected to an output of said feedback network, to said input terminal, and to said A-C amplifying means; a transformer; a first capacitor; one end of the secondary winding of said transformer being connected to the cathodes of said diodes, the other end of said secondary winding being connected to one side of said first capacitor, and with the other side of said first capacitor connected to the anode of said first diode, the secondary winding of said transformer including a tap; a parallel connected resistor and second capacitor connected between said tap and the anode of said second diode, with the said last named anode being grounded.

References Cited

UNITED STATES PATENTS

| | | | |
|---|---|---|---|
| 2,956,234 | 10/1960 | Olsen | 330—10 |
| 3,014,135 | 12/1961 | Hewlett et al. | 330—10 X |
| 3,369,186 | 2/1968 | Le Jor | 330—10 |

NATHAN KAUFMAN, Primary Examiner

U.S. Cl. X.R.

330—10